United States Patent [19]

Stein

[11] Patent Number: 5,704,712
[45] Date of Patent: Jan. 6, 1998

[54] METHOD FOR REMOTELY MEASURING TEMPERATURES WHICH UTILIZES A TWO WAVELENGTH RADIOMETER AND A COMPUTER

[75] Inventor: Alexander Stein, Secaucus, N.J.

[73] Assignee: Quantum Logic Corporation, Westport, Conn.

[21] Appl. No.: 588,504

[22] Filed: Jan. 18, 1996

[51] Int. Cl.$^6$ .................. G01J 5/06; G01J 5/52; G01J 5/00; G01K 13/00

[52] U.S. Cl. .................. 374/126; 374/127; 374/129; 374/141

[58] Field of Search .................. 374/126, 127, 374/128, 129, 141; 250/341.6; 364/557

[56] References Cited

U.S. PATENT DOCUMENTS

| | | | |
|---|---|---|---|
| 3,539,807 | 11/1970 | Bickel | 374/129 |
| 3,611,806 | 10/1971 | Hishikari | 374/129 |
| 3,796,099 | 3/1974 | Shimotsuma | 374/129 |
| 4,708,493 | 11/1987 | Stein | 374/126 |
| 4,979,133 | 12/1990 | Arima et al. | 374/126 |
| 4,979,134 | 12/1990 | Arima et al. | 374/126 |
| 5,165,796 | 11/1992 | Gat et al. | 374/128 |
| 5,231,595 | 7/1993 | Makino et al. | 374/126 |
| 5,326,173 | 7/1994 | Evans et al. | 374/126 |

FOREIGN PATENT DOCUMENTS

| | | | |
|---|---|---|---|
| 0167930 | 10/1983 | Japan | 374/129 |
| 0169038 | 10/1983 | Japan | 374/127 |
| 0171643 | 10/1983 | Japan | 374/129 |

*Primary Examiner*—Diego F.F. Gutierrez

[57] ABSTRACT

A method for remotely measuring the temperature of a target maintained at a first relatively low temperature while at the same time the target is heated by thermal radiation from a source spaced from the target and maintained at a second relatively high temperature which employs a two wavelength radiometer and a computer. First and second wavelengths are selected for use. The second wavelength is shorter than the first wavelength, both source and target exhibiting appreciable radiation at the first wavelength, the source emitting appreciable radiation while the target emits essentially no radiation at the second wavelength. The radiation of the source at the first wavelength and at the second wavelength are measured. These two source radiation measurements are stored in the computer. The radiation of the target at the first wavelength and at the second wavelength are measured. These two target radiation measurements are stored in the computer. These stored measurements in the computer are used to calculate the temperature of the target.

5 Claims, No Drawings

METHOD FOR REMOTELY MEASURING TEMPERATURES WHICH UTILIZES A TWO WAVELENGTH RADIOMETER AND A COMPUTER

BACKGROUND OF THE INVENTION

In many industrial applications employing furnaces with tubes located therein, liquid or gaseous charges are heated as they flow through the tubes. The tubes are heated to a relatively low temperature while the furnaces are heated at relatively high temperatures. It is often necessary to measure the temperature of the tubes, i.e., their thermal radiation, with a high degree of accuracy. However, since the temperature of the furnace walls is much higher than that of the tubes, radiation from the walls reflects off the tubes and adds itself to the their thermal radiation, and any measurement of the total radiation cannot be used as an accurate measurement of the actual temperature of the tubes. All of these temperatures must be measured remotely by radiometry.

The present invention is directed toward a new method of accurately measuring the temperature of a target such as furnace tubes which is maintained at a relatively low temperature when the target is heated by thermal radiation from a source spaced from the target and maintained at a second and relatively high temperature.

DETAILED DESCRIPTION OF THE INVENTION

In accordance with the principles of this invention, a method for remotely measuring the thermal radiation emitted essentially isotropically by a target maintained at a first relatively low temperature while at the same time the target is heated approximately isotropically by thermal radiation from a source spaced from the target and maintained at a second relatively high temperature employs a two wavelength radiometer and a computer.

Industrial furnaces use tubes inserted within and spaced from confining walls which are heated to relatively high temperatures by burners within the furnace. The walls radiate energy to the surfaces of the tubes and heat the tubes and the liquid or gaseous charges flowing therein. The relatively cool flowing charges cool the surfaces of the tubes to temperatures considerably lower than that of the walls.

It is often necessary to measure the temperature of the tubes with a high degree of accuracy in order to optimize the performance of the furnace. Radiometry, which is often the only practical method for making these measurements, involves measuring the self-emitted thermal radiation from the surfaces of the tubes. Since the temperature of the walls is much higher than that of the tubes, radiation from the walls reflects off the tubes. A pyrometer aimed at a tube receives two radiation components; emitted radiation and reflected wall radiation. Only the former is a measurement of tube temperature. The latter must be subtracted from the total received radiance to obtain the emitted tube radiance which yields the tube temperature after correction for tube emissivity.

The present invention is directed toward a new method for remotely measuring tube temperature.

The first step in using this method consists of selecting first and second wavelengths. The second wavelength must be shorter than the first wavelength. The first wavelength is so chosen that both source and target exhibit appreciable radiation thereat. The second wavelength is so chosen that the radiation reflected by the target at this wavelength is so much larger than the thermal radiation emitted by the target at this wavelength, that the thermal radiation emitted by the target at this wavelength can be valued essentially at zero.

Then the radiation from the source is measured in the radiometer at the first wavelength and at the second wavelength. These two source radiation measurements are then stored in the computer.

The radiation emanating from the target is measured in the radiometer at the first wavelength and at the second wavelength. These two target radiation measurements are then stored in the computer.

The computer is then operated, using the two stored source radiation measurements and the two stored target radiation measurements to calculate the temperature of the target.

The computer calculations are processed in the following manner. All bodies at a temperature T above absolute zero emit radiation of value $$L = E L/bb \qquad (1)$$

where L/bb is the black body radiation associated with the temperature T and E is the directional emissivity of the body's surface.

L/bb is defined as a function of temperature T by the Planck equation $$L/bb = c/i = \lambda \Gamma^{-5} \cdot [\exp(c/ii/[\lambda]kT)]^{-1} \qquad (2)$$

where [λ] is the wavelength of the radiation, c/i and c/ii are Planck constants; and k is the Boltzmann constant.

The value of E depends upon a variety of parameters such as the chemical composition and texture of the surface. Radiometers measure the target radiation remotely and a computer using equations (1) and (2) is used to compute the temperature. However, the accuracy of the measurement is determined by the accuracy of the value of the emissivity E. Thus, the accuracy of ordinary radiometers is limited by the uncertainly in E.

In the present invention the target is irradiated by intense ambient radiation from the source so that the source radiation reflects off the target and adds itself to the thermal radiation of the target. Consequently, a temperature measurement of this combined radiation cannot provide an accurate measurement of the target radiation by itself.

The target surface is illuminated essentially isotropically by the source radiation and the target's radiation is essentially isotropic as well. Under these conditions the total radiance in any one direction is defined as:

$$L/\text{target} = E[L/bb] + R[L/\text{source}] \qquad (3)$$

where R is the directional spectral hemispherical reflectivity of the target, E[L/bb] is the thermal radiance of the target as computed from equation (1) and L/source is the isotropic source radiance. The source radiance is much larger than the target radiance, thus creating the lack of accuracy of temperature measurement explained above.

Equation (3) holds for any wavelength. Two wavelengths A and B are chosen. At wavelength A, both source and target exhibit appreciable radiation. At wavelength B which is shorter than wavelength A, the source radiation reflected off the target is so much larger than the thermal emission of the target that the component for the target radiation can be neglected in solving equation (3).

Hence at wavelength B equation [3] becomes L/target= R[L/source], since L/bb is essentially zero. Solving this equation at wavelength B for R, $$R = L/\text{target divided by } L/\text{source.} \quad (4)$$

It is also known that the directional emissivity E at any given wavelength of opaque bodies can be determined from a measurement of the directional spectral hemispherical reflectance R at the same given wavelength in accordance with the Kirchhoff principle:

$$E = 1 - R \quad (5)$$

Hence, at wavelength B, $E = 1 - [L/\text{target divided by } L/\text{source}]$.

In many situations, the emissivity of the target has essentially the same value at both wavelengths. Under these conditions, at wavelength A wherein both reflected source radiation and target thermal emission are of appreciable value, equation (3) becomes $$L/\text{target} = E[L/bb] + [1-E][L/\text{source}] \quad (6)$$

As explained previously, the radiation of the source is measured in the radiometer at the first wavelength and at the second wavelength. The radiation of the target is measured in the radiometer at the first wavelength and at the second wavelength.

These two target and source radiation measurements are then stored in the computer. The computer then uses equations (4), (5), (6) and (2) to compute the temperature of the target.

In situations where the emissivity of the target has one value E/i at one selected wavelength A and has another value E/ii at the other selected wavelength, then the value E/i should be used in equation (6) and the value E/ii should be used in equation (5).

In a typical application of this invention, the target consists of tubes mounted inside furnace walls of refinery petroleum heaters which act as the source. Liquid or gaseous charges are heated as they flow through the tubes, which in turn are heated by radiation from the furnace walls. The wall radiation reflects off the tubes and adds itself to their thermal radiance, thereby distorting the measurement. Through use of this invention, the method eliminates the distortion and enables the correct temperature to be determined.

The average wall temperatures of such heaters are usually above 1300 degrees F. while the average tube temperature is below 900 degrees F. The first selected wavelength A is 3.9 um while the second selected wavelength is 1.65 um. In this case the emissivity of the target differs at the two wavelengths in accordance with the equation $$E \text{ at } 3.9 \text{ um} = E \text{ at } 1.65 \text{ um} + c/iii[3.9 \text{ um} - 1.65 \text{ um}] \quad (7)$$

The quantity c/iii can be obtained from published data. The computer then computes the temperature in the manner described above.

While the invention has been described with particular reference to a specific example, the protection desired is to be limited only by the terms of the claims which follow.

What is claimed is:

1. A method for measuring the temperature of tubes disposed within a furnace having heated walls which are maintained at a relatively high temperature, the tubes being spaced from the walls and having surfaces which are heated to relatively low temperature by radiation from the walls, said surfaces in turn emitting radiation at said relatively low temperature, said method employing a two wavelength radiometer and a computer, said method comprising the steps of:

selecting first and second wavelengths, the second wavelength being shorter than the first wavelength, both walls and tubes exhibiting appreciable radiation at the first wavelength, the walls emitting appreciable radiation while the tubes emit essentially no radiation at the second wavelength;

measuring with the radiometer the radiation of said walls at the first wavelength and at the second wavelength and storing these two walls radiation measurements in the computer;

measuring with the radiometer the radiation of said tubes at the first wavelength and at the second wavelength and storing these two tubes radiation measurements in the computer; and using the two stored tubes radiation measurements and the two stored walls radiation measurements in the computer to calculate the temperature of the tubes.

2. The method of claim 1 wherein the surface of said tubes is heated approximately isotropically by thermal radiation from the source.

3. The method of claim 2 wherein the tubes radiation is approximately isotropic.

4. The method of claim 3 wherein the emissivity of the tubes has essentially the same value at both wavelengths.

5. The method of claim 3 wherein the emissivity of the tubes at one of the first and second wavelengths differs in a known manner from the emissivity of the tubes at the other wavelength.

* * * * *